Jan. 19, 1926.

S. H. SUMBULIAN

CULTIVATOR

Filed July 3, 1924

Inventor
Sarkis H. Sumbulian

By

Attorney

Jan. 19, 1926.

S. H. SUMBULIAN

CULTIVATOR

Filed July 3, 1924

Inventor
Sarkis H. Sumbulian.
By
Attorney

Patented Jan. 19, 1926.

1,570,415

UNITED STATES PATENT OFFICE.

SARKIS H. SUMBULIAN, BY CHANGE OF NAME SARKIS HAIG BEULAN, OF FRESNO, CALIFORNIA.

CULTIVATOR.

Application filed July 3, 1924. Serial No. 724,118.

*To all whom it may concern:*

Be it known that I, SARKIS H. SUMBULIAN, a citizen of the United States, residing at Fresno, in the county of Fresno, State of California, have invented certain new and useful Improvements in Cultivators; and I do hereby declare the following to be a full, clear, and exact description of the invention, such as will enable others skilled in the art to which it appertains to make and use the same.

This invention relates to new and useful improvements in agricultural machines, and particularly to devices for use in cultivating vineyards and orchards.

The principal object of the invention is to provide a cultivator for use in vineyards and orchards, and which is constructed and arranged to withdraw the ground treating implement out of the line of draft when such implement is about to contact with a vine or tree.

Another object is to provide a device of this character wherein the ground treating implement is automatically withdrawn from its operative position, when in close proximity to a vine or tree, and subsequently projected into operative position, after the vine or tree has been passed.

A further object is to provide a device of this character which is constructed for attachment to a tractor, whereby to insure the proper draft, and the proper alinement of the treating implement, with respect to the row of plants.

A further object is to provide a device of this character wherein the implement operating mechanism is operated by the driving mechanism of the tractor.

Other objects and advantages will be apparent from the following description when taken in connection with the accompanying drawings.

Figure 2:
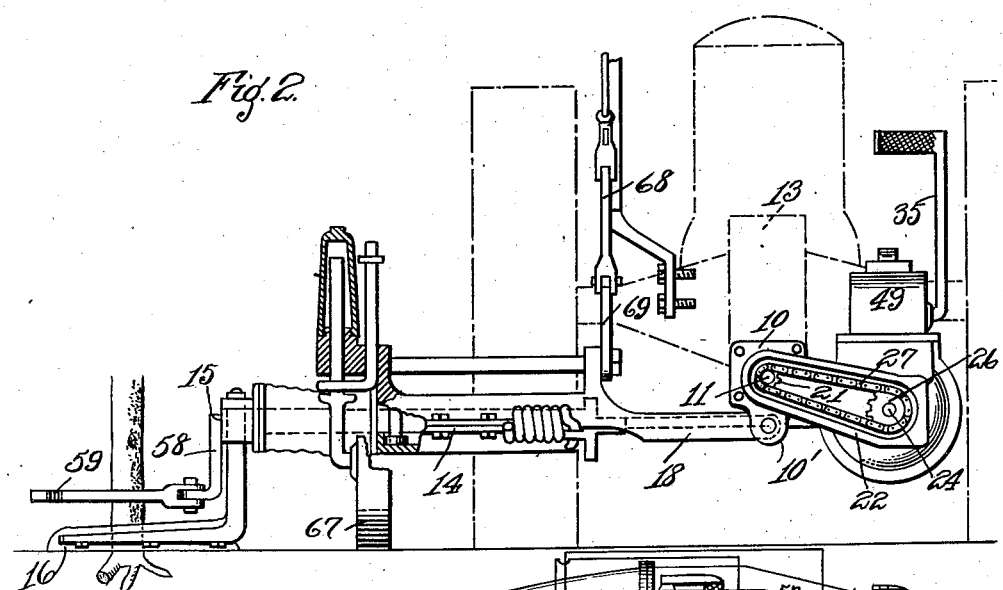
Figure 2 is a rear elevation of the same.
Figure 1:
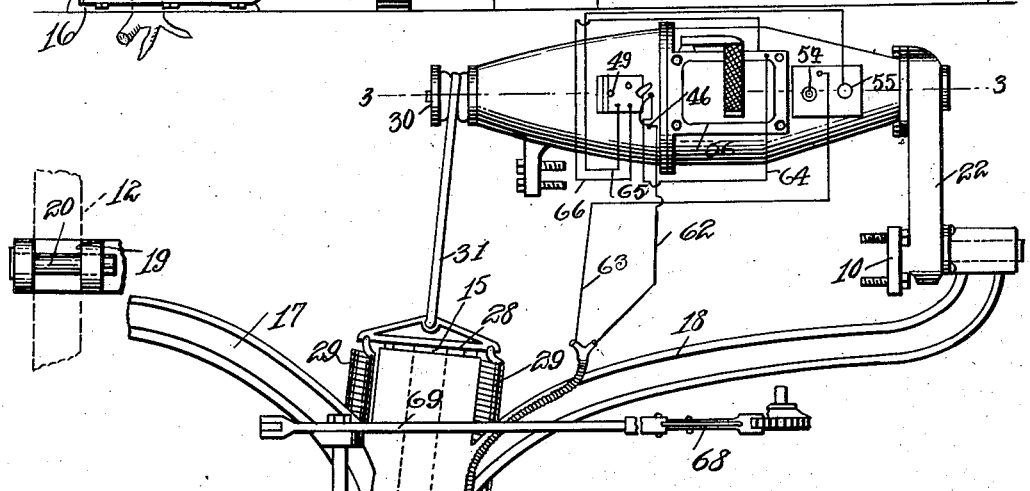
Figure 1 is a top plan view of the tractor attachment.
Figure 1:
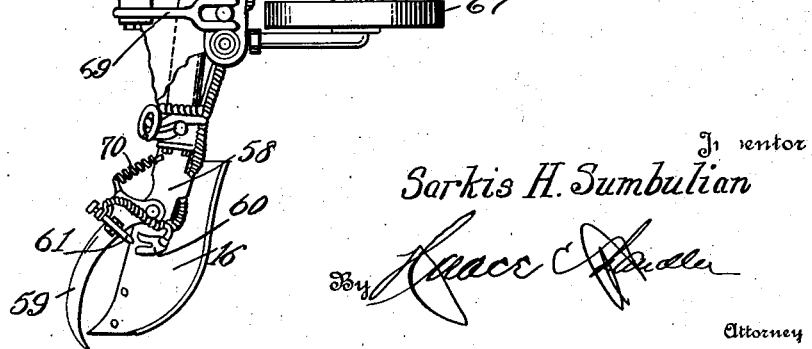
Figure 3:
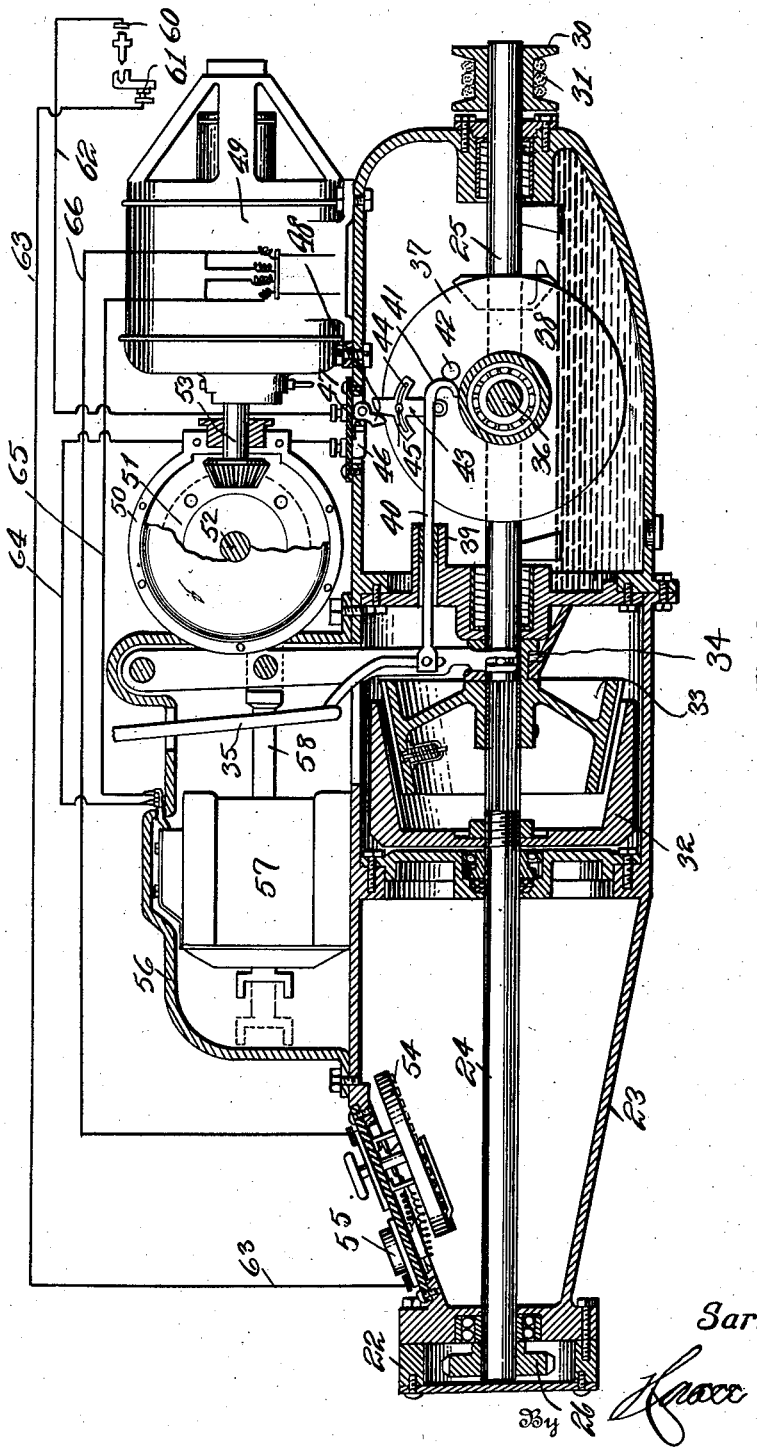
Figure 3 is an enlarged vertical longitudinal sectional view on the line 3—3 of Figure 1.

Referring particularly to the accompanying drawings, 10 represents the draft lug of a tractor, 11 the worm shaft, and 12 a portion of the front axle of the tractor, in connection with which the present invention is adapted for use. The tractor is shown in dotted lines, and is indicated by the numeral 13.

Extending from the side of the tractor, between the front and rear wheels thereof, is a horizontal frame 14, within which is longitudinally slidable a bar 15, a cultivator implement 16 being carried by the outer end of said bar. Formed on the inner end of the frame 14, and extending longitudinally of the tractor, forwardly and rearwardly, respectively, are the arms 17 and 18, the former of which is slightly shorter than the latter and has its extremity bifurcated, as shown at 19, with a pivot pin 20 disposed through the furcations thereof. This pin is the trunnion pin of the front axle of the tractor. The extremity of the other arm 18 is pivotally connected with an ear 10′ depending from the draft lug 10, whereby the entire frame 14 is capable of vertical swinging movement. On the rear end of the worm shaft 11 is fixed a sprocket wheel 21, to which reference will be made later herein. An elongated casing 22 is secured to the rear of the tractor, with one end in covering relation to the worm shaft 11, said casing extending downwardly and transversely of the tractor, where its other end is secured to the rear end of a larger elongated casing 23. Properly journaled in the casing 23, and extending longitudinally therein, with their inner ends in close proximity, are the shafts 24 and 25, the former of which has its rear end projecting beyond the end of the casing 23 and provided with a sprocket wheel 26. Engaged around this sprocket wheel 26, and the before-mentioned sprocket wheel 21, is a drive chain 27. The inner end of the bar 15 is provided with a transverse head 28, and connected to each end of this head, and to the frame 14, are the strong coil springs 29, said springs normally urging the bar outward, to project the ground treating implement 16 into operative position. The outer end of the shaft 25 projects beyond the end of the casing where it is provided with a pulley 30, and secured to and wound on this pulley is one end of a cable 31, the other end of which is secured centrally to the before-mentioned head 28. On the inner end of the shaft 24 is fixed the female member 32, of a clutch, the male member 33 being fixed to the adjacent end of the shaft 25. Engaged with the collar 34 of the clutch member 33 is the forked end of the upwardly extending, and pivoted, pedal lever 35, by means of which the said clutch member is shifted into and out of engagement with the member 32. Properly supported in one side of the casing 23, adjacent the intermediate portion of the shaft 25, and extending inwardly, is a stub shaft 36, a bevel gear 37 being fixed on the inner end thereof for engagement with a smaller gear 38 on the said shaft 25. Slidable through a guide 39, within the casing 23, is a rod 40, one end being pivotally connected with the pedal lever 35, and the other end being formed with a hook 41, arranged in the path of a laterally projecting pin 42, carried by one side face of the gear 37, and said hook being arranged to be engaged by said pin to pull the rod and rock the lever, for the purpose of shifting the clutch member 33, out of engagement with the member 32. Pivoted to the said face of the gear 37, a short distance from the pin 42, and extending radially with respect to the gear, is a trip arm 43, the same having a transverse arcuate slot 44, through which extends a screw 45, carried by the face of the gear, and by means of which the arm is adapted to be clamped in different pivoted positions. Carried by the lower face of the upper wall of the casing 23, over the gear 37, is a stationary circuit closing contact member 46, and pivotally supported on the casing, adjacent the contact 46, in position to swing into and out of engagement therewith, is a movable contact member 47, the same having a projection 48 arranged to be struck by the outer end of the trip arm 43, when the gear has nearly completed one revolution, as will be more clearly explained later herein. Mounted on the casing 23 is a D. C. generator 49. Mounted in a suitable support 50, on the casing 23, is a bevel gear 51, the shaft of which forms the belt pulley attachment 52, of the tractor, the generator shaft 53 being provided with a bevel gear meshing with this gear 51, to drive the generator, as the engine runs. In the other end of the casing 23 there is mounted a rheostat 54, and adjacent the rheostat is a meter 55, said meter and rheostat being connected in series. Disposed within a housing 56, mounted on the casing 23, is a solenoid magnet 57, the core 58 of which has its outer end pivotally connected to the before-mentioned pedal lever 35. Depending from the outer end of the slidable rod or bar 15 is an arm 58, and pivotally connected with the lower end thereof, is an arm 59 which extends horizontally over the ground treating implement 16, but with a slight forward inclination. Carried by the arm 58, and insulated therefrom, is a contact member 60, and carried by the arm 59, and insulated therefrom, is a contact member 61, the latter being arranged to be brought into engagement with the former upon rearward pivotal movement of the arm 59, due to contact with the stalk or stem of a vine or tree. The contact 60 is connected to the contact 47 by the wire 62, while the other contact 61 is connected with the meter 55 by a wire 63. The contact 46 is connected to one end of the coil of the solenoid 57 by means of a wire 64, while a wire 65 connects the other end of the coil with one terminal of the generator 49. A wire 66 connects the other terminal of the generator with the rheostat. An adjusting ground wheel 67 is carried by the frame 14, and is operable through the medium of the lever 68, mounted on the tractor, and the connecting links 69, and by means of which the frame 14 is capable of being elevated above the ground, when the device is to be moved to and from the field.

Normally the bar 15 is projected outwardly so that the implement 16 is in operative position within the ground, and as the tractor proceeds forwardly the implement will cultivate the soil in the row of vines or trees. When the implement is in close proximity to a vine or tree the arm 59 will contact with the vine or tree and being pivotally mounted, will swing rearwardly bringing the contact 61 into engagement with the contact 60, and as the contacts 46 and 47 are in engagement with each other, a circuit is completed 62 to 65, inclusive, with the result that current from the generator, which is constantly driven by the tractor, causes the energization of the solenoid 57, and the inward movement of the core thereof. The core rocks the pedal lever on its pivot and causes the male clutch member to be driven into frictional engagement with the female member, with the result that the shafts 24 and 25 are thus clutched together and rotate in unison. As the shaft 25 rotates the pulley on the outer end thereof winds the cable 31, with the result that the bar 15 is quickly withdrawn and the implement 16 moved out of the line of the plant rows in sufficient time to prevent contact thereof with the plant. As the shaft 25 continues to rotate it drives the gear 37, with the result that the pin 42 will, when the gear has made the greater portion of a revolution, engage with the hook 41, pulling the rod 40 and rocking the pedal lever 35, so that the male member 33 is withdrawn from the female member 32, thus disconnecting the shafts 24 and 25. The shaft 25 is then stationary, while the shaft 24 continues to rotate, being constantly driven by the chain 27. This movement of the pedal lever 35 causes the same to engage and move the core of the solenoid outwardly. At the same time that the pin 42 engages with the hook 41, the arm 43 engages the movable contact 47 withdrawing same from the contact 46, which breaks the circuit and permits the core of the solenoid to be withdrawn by the lever 35. A spring 70, connected to the arm 59 and to the arm 58, serves to yieldably hold the arm 59 in advanced position for contact with the plant, to operate prior to and in sufficient time to prevent the implement striking the plant. When the contact 61 has moved away from the contact 60, the circuit is thereby broken, whereupon the contact 47 is restored to its position in engagement with the contact 46. It will, of course, be understood that the driving connections between the tractor belt pulley shaft and the generator maintains the generator in operation while the tractor motor is in motion.

It will thus be seen that there is provided a cultivator for use in vineyards and orchards which is adapted to cultivate between the plants in the row, and which is automatic in its operation to withdraw the cultivator implement to prevent contact with a plant, and to immediately restore the implement to operative position in the row, after the plant has been passed. By this construction it is possible to cultivate close to the plants, and without danger of injury thereto.

What is claimed is:

1. An orchard cultivator including a ground treating implement, yieldable means for maintaining the implement projected into a row of spaced plants, a motor operated shaft having operative connections with the implement for withdrawing the latter from the row, an electric circuit including the motor, and a circuit closer on the implement and in said circuit, said circuit closer including an extension projecting forwardly of the implement for movement by contact with a plant.

2. An orchard cultivator including a frame, a bar slidable on the frame and carrying a ground treating tool, spring means between the bar and frame for normally maintaining the bar and tool projected into a row of spaced plants, means for withdrawing the bar, and means operatively connected with the withdrawing means and extending forwardly of said tool for contact with a plant and subsequently initiating movement of said withdrawing means.

3. An orchard cultivator including a ground treating implement, yieldable means for maintaining the implement within a row of spaced plants, an electric circuit, a motor included in the circuit, a shaft operable by the motor, flexible means connecting the shaft and the implement for withdrawing the implement from the row upon rotation of said shaft, and a circuit closer included in the circuit and mounted on the implement, said circuit closer including a controlling means projecting forwardly of the implement in position to be moved by contact with a plant.

4. In an orchard cultivator, the combination with a tractor, of a frame movably connected with the tractor, a ground treating implement carried by the frame and normally projected in position to operate in a row of spaced plants, an operating shaft constantly driven by the tractor, a second shaft operatively connected with the implement for withdrawing the latter from the row of plants, a clutch for the shafts, an electric circuit including a circuit closer, an arm forming a part of the circuit closer for closing the circuit upon contact with a plant, and an electro-magnetic means in the circuit for operating the clutch.

5. In an orchard cultivator, a frame, means for attaching the frame to a tractor, a frame carried by the first frame and projecting laterally therefrom, a member slidable on the second frame and having a ground treating implement on its outer end, spring means normally holding the slidable member in extended position, an electrically driven motor including a winding shaft, a cable connected with the shaft and the slidable member, and a circuit closer on the implement and having controlling means extending forwardly of the ground treating implement to be moved by contact with a plant to close a circuit through the motor whereby to wind the cable on said shaft for retracting said implement.

In testimony whereof, I affix my signature.

SARKIS H. SUMBULIAN.